(12) United States Patent
Mueller-Niehuus et al.

(10) Patent No.: US 10,612,662 B2
(45) Date of Patent: Apr. 7, 2020

(54) SEALING RING AND THE USE THEREOF

(71) Applicant: Carl Freudenberg KG, Weinheim (DE)

(72) Inventors: Kristian Mueller-Niehuus, Frankfurt (DE); Hans-Werner Guenther, Drakenburg (DE); Frank Schoenberg, Lampertheim (DE)

(73) Assignee: CARL FREUDENBERG KG, Weinheim (DE)

( * ) Notice: Subject to any disclaimer, the term of this patent is extended or adjusted under 35 U.S.C. 154(b) by 78 days.

(21) Appl. No.: 15/710,838

(22) Filed: Sep. 21, 2017

(65) Prior Publication Data

US 2018/0080562 A1 Mar. 22, 2018

(30) Foreign Application Priority Data

Sep. 22, 2016 (DE) .......................... 10 2016 001 448

(51) Int. Cl.
  *F16J 15/3212* (2016.01)
  *F16J 15/3208* (2016.01)

(52) U.S. Cl.
  CPC ....... *F16J 15/3212* (2013.01); *F16J 15/3208* (2013.01)

(58) Field of Classification Search
  CPC .. F16J 15/3212; F16J 15/3208; F16J 15/3456; F16J 15/3204
  See application file for complete search history.

(56) References Cited

U.S. PATENT DOCUMENTS

| | | | | |
|---|---|---|---|---|
| 2,088,703 A | * | 8/1937 | Hubbard | F16C 33/74 126/314 |
| 2,208,482 A | * | 7/1940 | Victor | F16J 15/3212 277/569 |
| 2,249,141 A | * | 7/1941 | Johnson | F16J 15/3212 277/554 |
| 2,430,836 A | * | 11/1947 | Taylor | F16J 15/20 277/530 |
| 2,434,484 A | * | 1/1948 | Chambers, Jr. | F16J 15/3212 277/553 |
| 2,434,485 A | * | 1/1948 | Chambers, Jr. | F16J 15/3212 277/555 |
| 2,630,343 A | | 3/1953 | Jones et al. | |
| 2,675,258 A | * | 4/1954 | Dutton-Forshaw | F16J 15/3212 267/155 |

(Continued)

FOREIGN PATENT DOCUMENTS

DE 202008017339 U1 10/2009
DE 102009053558 A1 5/2011

(Continued)

*Primary Examiner* — Eugene G Byrd
(74) *Attorney, Agent, or Firm* — Leydig, Voit & Mayer, Ltd.

(57) ABSTRACT

A sealing ring which, when viewed in cross section, is formed in the shape of a 7, has a first axial leg and a sealing leg that has a sealing lip, the sealing leg being connected to a first end face of the axial leg by means of a joint, and has a clamping element for stabilizing the sealing leg in the radial direction. The clamping element is annular and, when viewed in cross section, is formed by a 7-shaped spring, and has a second axial leg and a stabilizing leg, the second axial leg being connected to the first axial leg and the stabilizing leg being connected to the sealing leg.

14 Claims, 1 Drawing Sheet

(56) References Cited

U.S. PATENT DOCUMENTS

| | | | | |
|---|---|---|---|---|
| 2,750,212 | A * | 6/1956 | Skinner | F16J 15/324 |
| | | | | 277/577 |
| 3,493,235 | A * | 2/1970 | Pautz | B63H 5/10 |
| | | | | 277/433 |
| 3,729,204 | A * | 4/1973 | Augustin | F16J 15/3208 |
| | | | | 277/559 |
| 3,752,367 | A * | 8/1973 | Sundholm | F04B 53/14 |
| | | | | 222/256 |
| 3,830,508 | A * | 8/1974 | Endicott | F16J 15/3208 |
| | | | | 277/553 |
| 3,871,665 | A * | 3/1975 | Burke | F16J 15/3212 |
| | | | | 277/550 |
| 3,901,517 | A | 8/1975 | Heathcott | |
| 3,945,650 | A * | 3/1976 | Voitik | F16J 15/3208 |
| | | | | 277/556 |
| 9,132,539 | B1 * | 9/2015 | Epshetsky | B29D 99/0085 |
| 2002/0153665 | A1 * | 10/2002 | Borstel | F16J 15/164 |
| | | | | 277/560 |
| 2014/0265139 | A1 * | 9/2014 | Dilmaghanian | F16J 15/3208 |
| | | | | 277/309 |
| 2015/0014941 | A1 * | 1/2015 | Yanagiguchi | F16J 15/3212 |
| | | | | 277/549 |
| 2016/0033044 | A1 * | 2/2016 | Yako | F16J 15/164 |
| | | | | 277/589 |
| 2016/0053894 | A1 | 2/2016 | Mueller-Niehuus et al. | |

FOREIGN PATENT DOCUMENTS

| | | | | |
|---|---|---|---|---|
| EP | 2988035 | A1 | 2/2016 | |
| FR | 1132266 | A | 3/1957 | |
| GB | 612830 | A | 11/1948 | |
| JP | 2007091214 | A * | 4/2007 | B60T 11/232 |
| WO | WO 2009143972 | A1 | 12/2009 | |

\* cited by examiner

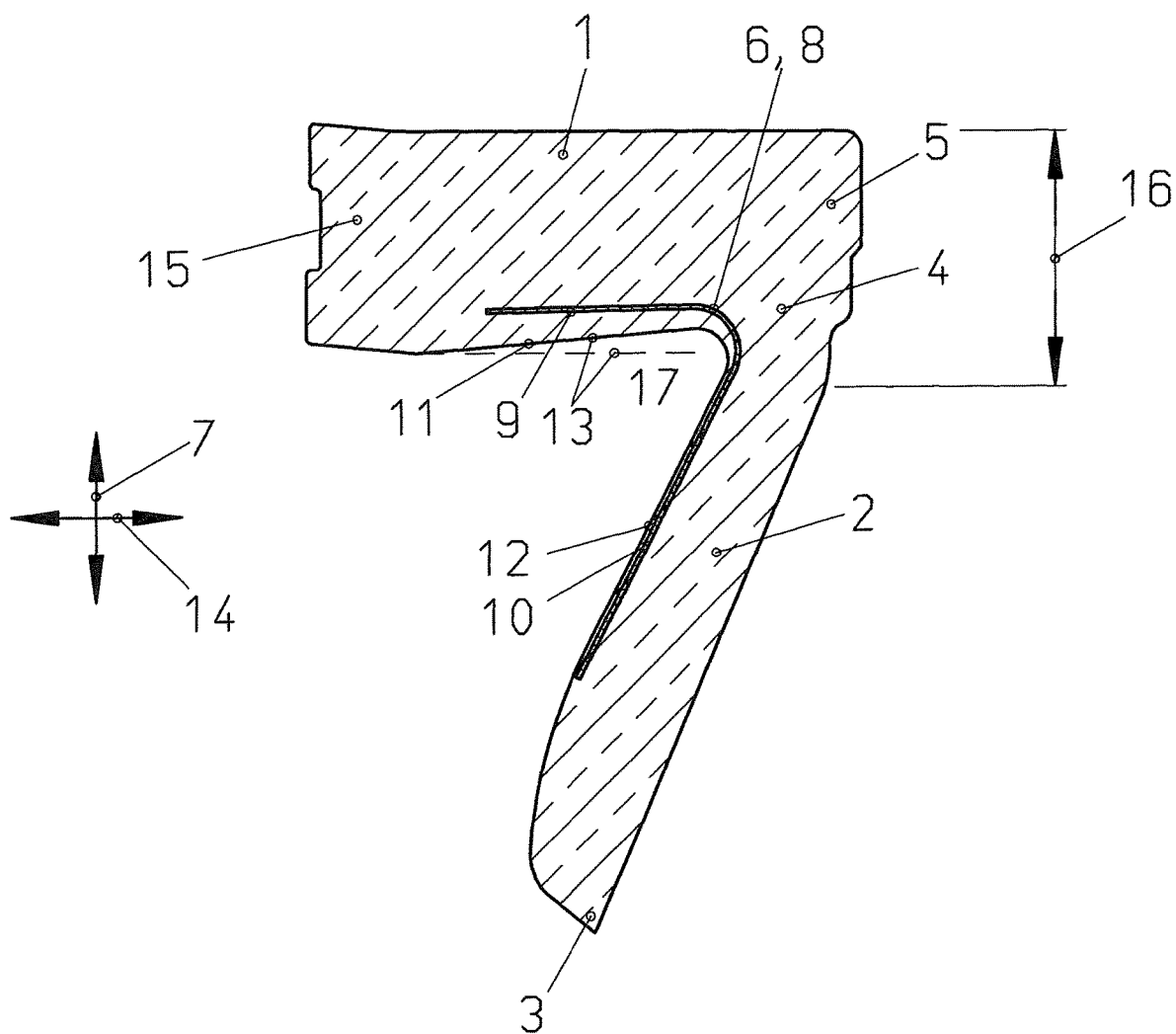

SEALING RING AND THE USE THEREOF

CROSS-REFERENCE TO RELATED APPLICATIONS

Priority is claimed to German Patent Application No. DE 10 2016 011 448.7, filed on Sep. 22, 2016, the entire disclosure of which is hereby incorporated by reference herein.

FIELD

The invention relates to a sealing ring and to the use thereof.

BACKGROUND

A sealing ring of this kind is known from EP 2 988 035 A1. The previously known sealing ring is used for sealing grease and comprises a clamping element that is arranged in an installation groove of the sealing ring. The installation groove is arranged on the side of the sealing leg radially remote from the sealing lip, the installation groove comprising an installation opening for the clamping element on the side radially remote from the sealing lip, which installation opening is delimited by two guide connecting pieces arranged adjacently to one another and so as to be spaced in the axial direction. The joint, when viewed in the radial direction and when the sealing ring is as manufactured, is arranged in the center of the sealing ring. Likewise in the radial direction and in the center of the sealing ring, a joint space formed in the axial direction so as to be open on one side and substantially C-shaped is arranged in the region of the joint. Said joint space is designed such that the medium to be sealed located therein is removed from said space. Since no medium to be sealed is retained inside the joint space, undesired hardening of the sealing ring is prevented and the sealing leg is able to follow high dynamic deflection movements of a machine element to be sealed, without the contact pressures by means of which the sealing lip sealingly contacts the machine element to be sealed changing considerably.

Another sealing ring of the type mentioned at the outset is known from DE 10 2009 053 558 A1. The sealing ring is formed in the shape of a 7 and comprises a first axial leg that is comparatively thick in the radial direction and a sealing leg that has a sealing lip, the sealing leg being connected to a first end face of the axial leg by means of a joint. A separately produced clamping element for stabilizing the sealing leg in the radial direction is, in contrast, not provided. The joint, when viewed in the radial direction and when the sealing ring is as manufactured, is arranged in the center of the sealing ring. The two end faces of the axial leg are formed so as to have projections and are supported in an installation space of a sealing arrangement by means of said projections, rotation/tilting of the sealing ring in the installation space being prevented by the projections when said sealing ring is used as intended. The projections may be formed as circumferentially enclosing, self-contained bulges which result in a particularly good clamping action of the axial leg in the installation space.

SUMMARY

An aspect of the invention provides a sealing ring which, when viewed in cross section, has a shape of a 7, the sealing ring comprising: a first axial leg; a second axial leg; a stabilizing leg; a sealing leg including a sealing lip; and a clamping element configured to stabilize the sealing leg in a radial direction, wherein the sealing leg is connected to a first end face of the axial leg using a joint, wherein the clamping element is annular and, when viewed in cross section, is formed by a 7-shaped spring, wherein the second axial leg is connected to the first axial leg, and wherein the stabilizing leg is connected to the sealing leg.

BRIEF DESCRIPTION OF THE DRAWING

The present invention will be described in even greater detail below based on the exemplary FIGURES. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 a schematic view of an embodiment of the sealing ring according to the invention.

DETAILED DESCRIPTION

An aspect of the invention relates to a sealing ring and to the use thereof, the sealing ring, when viewed in cross section, being formed in the shape of a 7 and comprising a first axial leg and a sealing leg that has a sealing lip, the sealing leg being connected to a first end face of the axial leg by means of a joint, and comprising a clamping element for stabilizing the sealing leg in the radial direction.

The problem addressed by an aspect of the invention is that of developing a sealing ring of the type mentioned at the outset such that said sealing ring has, substantially irrespective of the diameter to be sealed, improved service properties over the course of a longer usable life, in particular such that the sealing lip, irrespective of the installation situation of the sealing ring, sealingly contacts a surface to be sealed of a machine element to be sealed with consistent radial prestress over the course of a longer usable life.

Moreover, uses are intended to be found for which the sealing ring according to aspects of the invention are particularly suitable.

In order to solve the problem(s) described in the Background, an aspect of the invention provides that the clamping element is annular and, when viewed in cross section, is formed by a 7-shaped spring, and comprises a second axial leg and a stabilizing leg, and that the second axial leg is connected to the first axial leg and the stabilizing leg is connected to the sealing leg.

The clamping element, which has a shape that corresponds to the shape of the entire sealing ring, specifically the shape of a 7, ensures the advantageous service properties of the sealing ring irrespective of whether the sealing leg is arranged so as to have its sealing lip radially inside the sealing ring or radially outside the sealing ring.

The clamping element may be substantially equal-sided.

The sealing ring from the document EP 2 988 035 A1 mentioned at the outset is mainly intended for radially inward-sealing systems. The sealing leg and the sealing lip are arranged radially inside the sealing ring, the sealing lip sealingly enclosing a surface to be sealed of a machine element to be sealed, for example a shaft, under radial prestress.

For radially outward-sealing systems, when the axial leg is arranged radially inside and the sealing leg comprising the sealing lip extends, starting from the axial leg, radially outwards, annular helical springs formed as clamping elements are disadvantageous. Annular helical springs are currently used as tension springs for inward-sealing systems. For outward-sealing systems, a spring of this kind should be designed as a pressure spring. This is possible in principle, but often makes the assembly and reliable positioning of the spring in the installation space more difficult. The risk of springing out of the installation space is much higher than in comparison with a tension spring.

For the sealing ring according to the invention, a 7-shaped spring is by contrast used as the clamping element, the shape of which is matched to the shape of the sealing ring. A sealing ring of this kind has the advantage that it can be easily used in outward-sealing systems in which the sealing leg comprising the sealing lip thus extends radially outwards and, for example, sealingly contacts a wall delimiting a housing hole.

The service properties of the sealing ring according to the invention are always consistently good irrespective of whether the sealing lip is arranged radially inside or radially outside the sealing ring. Owing to the above-described shape of the spring, the radial spring force comes from the radial movement of the spring. In this case, it is irrelevant for use whether the system is outward sealing or inward sealing. The sealing lip is pressed onto a surface to be sealed due to the spring bending and this can therefore be realized irrespective of diameter.

Comparatively large radial deflection movements of the machine element to be sealed can be easily compensated for by the 7-shaped spring without the contact pressure by means of which the sealing lip sealingly contacts the surface to be sealed changing considerably.

Moreover, it is advantageous that the 7-shaped spring can be produced simply and cost-effectively. The integration of a spring of this type in a sealing ring is also easy.

According to an advantageous embodiment, it can be provided that the second axial leg is embedded in the first axial leg and the stabilizing leg is embedded in the sealing leg. An advantage of this is that the spring forms an integral component of the sealing ring. An undesired loss of the spring, both during storage of the sealing ring before it is used and during intended use when installed, can thereby be reliably prevented.

The second axial leg may be enclosed by the first axial leg and the stabilizing leg may be at least substantially enclosed by the sealing leg. An advantage of this is that the positioning of the spring in the sealing ring is particularly reliable and permanent. In this case, the sealing ring appears to be functionally in a single piece and the effort required to assemble the sealing ring is thus low. The risk of assembly errors is also kept to a minimum.

According to an advantageous embodiment, the spring is completely enclosed by sealing material of the first axial leg and the sealing leg. The spring is thus well protected against external influences.

Inside the sealing ring, the spring is preferably arranged on the mutually facing sides of the first axial leg and sealing leg. An advantage of this is that the spring substantially directly delimits the substantially C-shaped joint space of the sealing ring. The service properties of the sealing ring, in particular the pivoting motion of the sealing leg comprising the sealing lip about the joint, substantially depends on the service properties of the spring. Even for larger radial deflection movements of a machine element to be sealed and corresponding pivoting movements of the sealing leg comprising the sealing lip about the joint, there is no undesired hardening of the sealing ring due to the sealing material, which is arranged at an acute angle to the spring and could be compressed in an undesired manner about the joint during pivoting movements of the sealing leg and could thus disadvantageously alter the service properties of the sealing ring.

The spring may consist of a spring steel. An advantage of this is that the spring does not relax even over the course of a long usable life of the sealing ring and the sealing ring thus has consistently good service properties over the course of a long usable life. Other materials that may be used for the spring may, for example, be polymer materials that have sufficiently good elastic service properties.

The first axial leg and the sealing leg, more preferably the first axial leg, the sealing leg and the joint, may be formed from the same material and so as to merge integrally into one another and consist of one sealing material. Owing to the simple construction requiring few components, the sealing ring can be produced simply and cost-effectively. The sealing material may be an elastomer or a polyurethane, the sealing material preferably having a Shore A hardness of from 60 to 98. Materials of this kind make it possible to achieve a good sealing action over the course of a long usable life.

According to an advantageous embodiment, it can be provided that the first axial leg has an undercut on the side thereof radially facing the sealing leg, which undercut extends in the axial direction from a second end face of the first axial leg towards the first end face and the joint. In general, it has proven to be advantageous in respect of the service properties, in particular in respect of the service properties of the sealing ring in radially outward-sealing systems, if the joint between the first axial leg and the sealing leg is arranged as far away as possible from the sealing lip in the radial direction. The sealing leg is thus able to follow radial deflection movements of a machine element to be sealed particularly well even if said deflection movements are comparatively large in the radial direction. The size of the radial deflection movements depends on the diameter to be sealed. The diameters to be sealed for wind turbines may be, for example, 4 m; the diameters to be sealed for tunnel-boring machines may be, for example, 18 m.

Owing to the joint arranged as far as possible away from the sealing lip in the radial direction and the good elastic compliance of the sealing leg resulting therefrom, the sealing lip contacts the surface to be sealed in this case, too, with a consistently good pressure and thus a consistently good sealing action over the entire circumference.

The above-described advantageous service properties of the sealing ring are facilitated in that the joint, when viewed in the radial direction and when the sealing ring is as manufactured, is arranged in the broadest third of the sealing ring remote from the sealing lip. The compensating ability at high eccentricities and large diameters to be sealed is, for sealing rings in which the joint, when viewed in the radial direction and when the sealing ring is as manufactured, is arranged approximately in the center of the sealing ring, significantly lower in comparison with the above-described embodiment.

As already described above, the sealing lip can be arranged radially inside or radially outside the sealing ring. It has surprisingly been found that the sealing ring has consistently good service properties irrespective of whether the sealing lip is arranged radially inside or radially outside the sealing ring. Radially outwardly arranged surfaces to be sealed can be sealed by the sealing ring with the same reliability as radially inwardly arranged surfaces to be sealed.

The above-described sealing ring can be used in tunnel-boring machines, wind turbines or other radial applications.

The sealing ring shown in the FIGURE is in the shape of a 7 and comprises a likewise 7-shaped spring 8 as the clamping element 6, which spring forms an integral component of the sealing ring and is completely enclosed by the sealing material of the sealing ring.

The sealing ring comprises the first axial leg 1 and the sealing leg 2 comprising the sealing lip 3, the sealing leg 2 and the sealing lip 3 being arranged radially inside or radially outside the sealing ring depending on the application. Schematically shown by the two axes of symmetry is the, radially adjacently to the sealing lip 3 or radially adjacently to the first axial leg 1.

The sealing leg 2 is hinged on the first end face 5 of the axial leg 1 by means of the hinge 4, the hinge 4 being arranged as far away as possible from the sealing lip 3 in the radial direction 7, in order also to be able to compensate for large eccentricities of a machine element that is not shown here. Said large eccentricities mainly occur if the diameter to be sealed is large, for example approximately 2 m or more.

The joint 4 is formed from the same material as and so as to merge integrally into the axial leg 1 and the sealing leg 2. When viewed in the radial direction 7 and when the sealing ring is as manufactured, the joint 4 is arranged in the broadest third 16 of the sealing ring remote from the sealing lip 3. In order to further improve the pivoting motion of the sealing leg 2 relative to the first axial leg 1 about the joint 4, it is provided that the first axial leg 1 has the undercut 13 on the side 11 thereof radially facing the sealing leg 2, which undercut extends in the axial direction 14 from the second end face 15 of the first axial leg 1 towards the first end face 5 and the joint 4.

The spring 8 delimits a C-shaped joint space 17, which is delimited by mutually facing sides 11, 12 of the first axial leg 1 and sealing leg 2. The spring 8 is arranged virtually directly adjacent to said joint space 17, substantially directly under the surface of the first axial leg 1 and sealing leg 2. The second axial leg 9 of the spring 8 extends in parallel with the axis of the first axial leg 1 of the sealing ring, and the stabilizing leg 10 of the spring 8 extends substantially in parallel with the sealing leg 2. The stabilizing leg 10 ensures that the sealing leg 2 and thus the sealing lip 3 are assigned to a machine element to be sealed in the circumferential direction over the course of a long usable life with constantly equal contact pressure, the sealing lip 3 sealingly contacting a surface of a machine element to be sealed.

The machine element to be sealed may be formed, in a radially inward-sealing manner, by a shaft to be sealed or, in a radially outward-sealing manner, by a wall to be sealed that delimits a housing hole.

The service properties of the sealing ring according to the invention are always consistent irrespective of whether the sealing lip 3 is arranged radially inside or radially outside the sealing ring. Owing to the above-described 7-shaped form of the spring 8, the radial spring force comes from the radial movement of the spring 8. The sealing lip 3 is pressed onto a surface to be sealed due to the bending of the spring 8 and this thus occurs irrespective of diameter.

Owing to the good service properties over the course of a long usable life, even if the sealing ring is radially outward-sealing, the sealing ring according to the invention is particularly well suited for use in tunnel-boring machines or wind turbines.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A sealing ring which, when viewed in cross section, has a shape of a 7, the sealing ring comprising: a first axial leg including a first end face and a second end face; a second axial leg connected to the first axial leg; a stabilizing leg; a sealing leg including a sealing lip, the sealing leg being connected to the stabilizing leg; and a clamping element configured to stabilize the sealing leg in a radial direction, wherein the sealing leg is connected to the first end face using a joint, wherein the clamping element is annular, and, when viewed in cross section, is formed by a 7-shaped spring, wherein the first axial leg includes an undercut on a side thereof radially facing the sealing leg, the undercut extending in an axial direction from the second end face towards the first end face and the joint, and wherein the undercut results in the first axial leg having a gradual reduction in thickness moving from the second end face towards the first end face.

2. The sealing ring of claim 1, wherein the second axial leg is embedded in the first axial leg, and
    wherein the stabilizing leg is embedded in the sealing leg.

3. The sealing ring of claim 1, wherein the second axial leg is at least substantially enclosed by the first axial leg, and
    wherein the stabilizing leg is at least substantially enclosed by the sealing leg.

4. The sealing ring of claim 1, wherein the spring is arranged on mutually facing sides of the first axial leg and the sealing leg.

5. The sealing ring of claim 1, wherein the spring includes a spring steel.

6. The sealing ring of claim 1, wherein the spring consists of a spring steel.

7. The sealing ring of claim 1, wherein the first axial leg and the sealing leg are formed from the same material and so as to merge integrally into one another and include a sealing material.

8. The sealing ring of claim 1, wherein the first axial leg and the sealing leg are formed from the same material and so as to merge integrally into one another and include only one sealing material.

9. The sealing ring of claim 1, wherein the first axial leg, the sealing leg, and the joint are formed from the same material and so as to merge integrally into one another and include a sealing material.

10. The sealing ring of claim 1, wherein the first axial leg, the sealing leg, and the joint are formed from the same material and so as to merge integrally into one another and include only one sealing material.

11. The sealing ring of claim 1, wherein, in a manufactured state of the sealing ring, the joint, when viewed in the radial direction, is arranged in a broadest third of the sealing ring remote from the sealing lip.

12. The sealing ring of claim 1, wherein the sealing lip is arranged inside the sealing ring in the radial direction.

13. The sealing ring of claim 1, wherein the sealing lip is arranged outside the sealing ring in the radial direction.

14. A tunnel-boring machine or wind turbine, comprising the sealing ring of claim 1.

\* \* \* \* \*